United States Patent [19]
Cooper

[11] Patent Number: 5,819,790
[45] Date of Patent: Oct. 13, 1998

[54] FLUID CHECK VALVE

[75] Inventor: James Nicholas Cooper, Huddersfield, United Kingdom

[73] Assignee: Goodwin International Limited, United Kingdom

[21] Appl. No.: 718,305

[22] PCT Filed: Mar. 24, 1995

[86] PCT No.: PCT/GB95/00662

§ 371 Date: Sep. 24, 1996

§ 102(e) Date: Sep. 24, 1996

[87] PCT Pub. No.: WO95/27163

PCT Pub. Date: Oct. 12, 1995

[30] Foreign Application Priority Data

Mar. 30, 1994 [GB] United Kingdom .................... 9406326

[51] Int. Cl.⁶ ............................................... F16K 15/00
[52] U.S. Cl. ........................................ 137/512.1; 137/454.2
[58] Field of Search ............................. 137/512.1, 454.2

[56] References Cited

U.S. PATENT DOCUMENTS

| | | | |
|---|---|---|---|
| 3,678,958 | 7/1972 | Satterwhite et al. | 137/512.1 |
| 4,196,745 | 4/1980 | Schutzer | 137/512.1 |
| 4,867,199 | 9/1989 | Marx | 137/512.1 |
| 4,977,926 | 12/1990 | Hocking | 137/512.1 |
| 5,301,709 | 4/1994 | Gasaway | 137/512.1 |
| 5,381,821 | 1/1995 | Muddiman | 137/512.1 |
| 5,392,810 | 2/1995 | Cooper et al. | 137/512.1 |

FOREIGN PATENT DOCUMENTS

| | | | |
|---|---|---|---|
| 0 160 576 | 11/1985 | European Pat. Off. | 137/512.1 |
| 2 107 717 | 4/1972 | France | 137/512.1 |
| 1 314 509 | 4/1973 | United Kingdom | 137/512.1 |
| 1 518 576 | 7/1978 | United Kingdom | 137/512.1 |
| 2 204 662 | 11/1988 | United Kingdom | 137/512.1 |
| 2 264 161 | 8/1993 | United Kingdom | 137/512.1 |

OTHER PUBLICATIONS

Copy of International Report dated Sep. 28, 1995.

*Primary Examiner*—Denise L. Ferensic
*Assistant Examiner*—Joanne Y. Kim
*Attorney, Agent, or Firm*—Harness, Dickey & Pierce, P.L.C.

[57] ABSTRACT

A dual plate check valve has flaps (6) mounted on one or more hinge pins (7). The ends of the hinge pins (7) are received in sockets in inserts (12), which inserts (12) are receivable in open-sided recesses (13) formed in the annular valve housing (1) and are held in place by a keeper (14) located in a generally radially outwardly extending slot (15) formed in that housing (1). Where a single hinge pin (7) is used in a vertical orientation to support both flaps (6), a cylindrical bearing member may be supported by a lower one of said inserts (12) to extend through a lower hinge lug (21) of the first flap and partially through a lower hinge lug (20) of the second flap, thereby to support the lower hinge lug of the second flap independently of the first flap.

4 Claims, 5 Drawing Sheets

FLUID CHECK VALVE

This invention relates to fluid check valves and in particular to dual plate check valves, that is to say check valves having two plates or flaps.

Dual plate check valves comprise an annular housing with two substantially semi-circular or D-shaped valve members, referred to as plates or flaps and sometimes also referred to as flappers or wafers, pivotally mounted on a diametral hinge pin. In some cases each plate may be mounted on a separate hinge pin. These plates can take up a valve closed position in which they shut respective semi-circular or D-shaped apertures defined in the housing by a diametral cross piece. The plates are generally spring-urged towards the closed position. They can be urged by pressure of a given level on the upstream side of the valve towards an open position in which they lie generally parallel to the housing axis. A stop pin may be provided parallel to and downstream of the hinge pin to prevent either plate from pivoting more than 90° from the valve closed position.

Such dual plate check valves are non-return valves which open in response to pressure at a given level at the upstream side, that is to say pressure applied to the plates via the semi-circular openings. As pressure decreases, and the flow rate drops, the plates may be urged by reverse pressure, in some cases with the assistance of spring means, towards the valve closed position.

The hinge and stop pins are both normally fixed into the housing by being inserted through holes bored in the housing and then retained therein by means of screwed plugs applied from outside the housing. A requirement is that the screw plugs should permit easy disassembly so that internal parts such as the pin itself, the plates and the spring, if present, can readily be replaced as required. However, corrosion can, over a period, when combined with differential thermal expansion and contraction, loosen the plugs. Leakage may arise due to the plug threads being differentially attacked in corrosive situations leading to local corrosion and eventually leakage and loosening of the plugs.

Dual plate check valves may be of sandwich type, to be held in pipework between two flanges by long bolts, or alternatively of lug type, having lugs extending outward at one or both ends. Particularly with the sandwich type of valve the screw plugs can interfere with the fixing bolts.

To address the above problems the present applicant has previously proposed in European patent application EP-A-0,160,576 dual plate check valves with flaps mounted on one or more hinge pins where the or each hinge pin extends at each end into a bore in an insert, the inserts being received in respective slots in the body. Various means are proposed for retaining the inserts in place within the slots without movement. The preferred retaining system comprises a ring which extends into a groove at the end of the body, from which groove said slots extend, wherein the zone of abutment between the ring and body is radially inwards of the edge of the body, the ring having a smaller outer radius than the external radius of the body and being held in position in the valve body by screws.

Such dual plate check valves wherein the or each hinge pin and, where present, the stop pin are mounted in transverse bores in inserts received in slots formed in the interior of the annular housing provide solutions to the above problems. Such valves may employ an arrangement when there is some play between the hinge pin and insert to reduce wear on sealing surfaces because on opening the inner straight edge of the "D" shaped valve plates lift off the seat before pivoting occurs, so that the plate does not scuff on the cross member of the seat. This can be brought about by providing play between the hinge pin and the inserts. While the play between hinge pin and inserts will in due course cause wear, it is wear in cheap and easily replaceable parts, not in the valve body itself.

We have now developed an alternative system for holding the pin mounting inserts firmly in slots in the housing without movement which is cheap and easy to manufacture and assemble and particularly effective. According to the present invention there is provided a dual plate check valve comprising an annular housing and two closing flaps effective to close a passage through the housing, the flaps being mounted on one or more hinge pins, the or each hinge pin extending at each end into a socket in an insert, the inserts being received in respective open sided recesses in the annular housing and wherein each said insert is retained in a said recess by means of a keeper plate located in a generally radial outwardly extending slot formed in said annular housing.

In a further aspect of the present invention there is provided a dual plate check valve comprising:

an annular housing and two closing flaps effective to close a passage through said housing;

a single hinge pin for supporting both flaps by means of hinge lug on each plate;

a cylindrical bearing member through which said hinge pin passes, said cylindrical bearing member being arranged such that when the valve is orientated for use with the hinge pin in a vertical orientation the cylindrical bearing member is supported on said annular housing and extends through a lower hinge lug of a first flap and partially through a lower hinge lug of a second flap, thereby to support said lower hinge lug of said second flap independently of said lower hinge lug of said first flap.

The invention will be more clearly understood by reference to the following description given by way of example only with reference to the figures in which.

Figure 1:
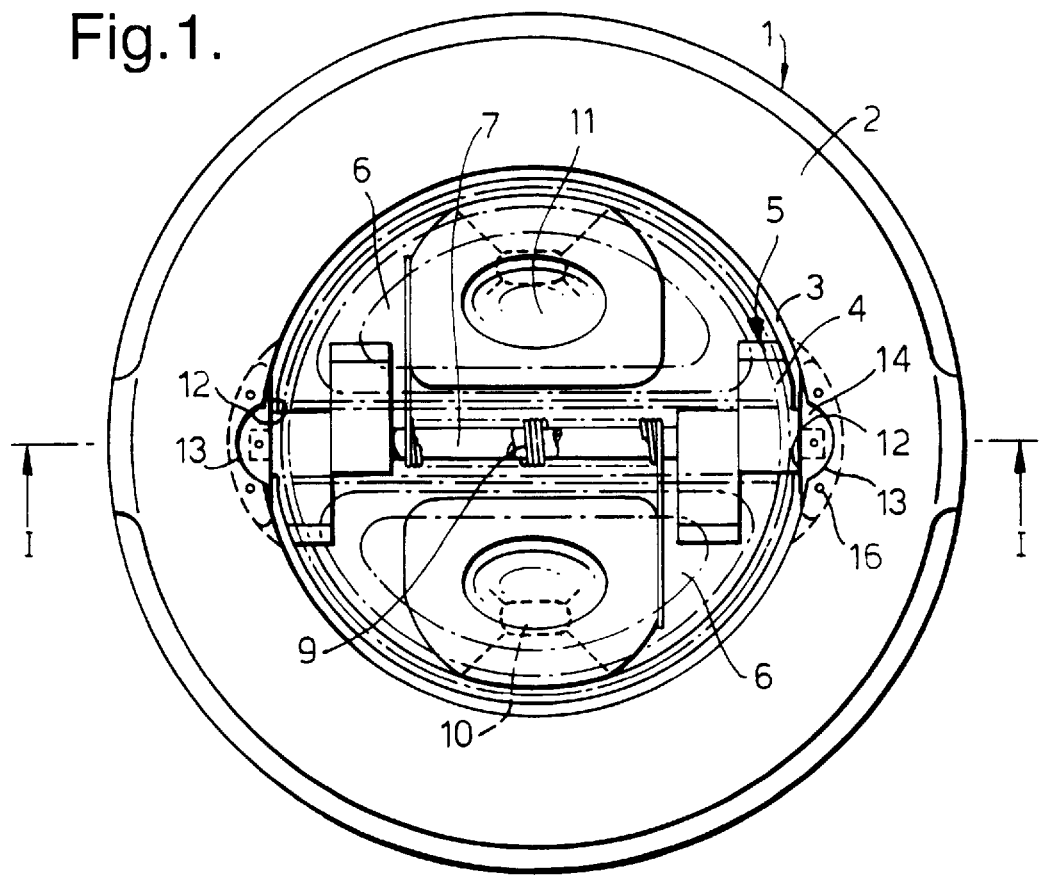
FIG. 1 is an axial end elevation of a dual plate check valve according to the present invention.

The valve diagrammatically shown in FIGS. 1 to 4 comprises a valve body 1 having a generally hollow cylindrical shape comprising side walls 2. Inwardly projecting from side walls 2 and generally integrally formed therewith, is an annular seat member 3. The annular seat member 3 together with a diametral cross member 4 comprises a substantially planar valve seat area 5. The annular seat member 3 and diametral cross member 4 together define two D-shaped apertures, through which fluid may flow from an upstream side of the valve seat 5 to a downstream side thereof, that is from bottom to top of FIG. 2.

First and second generally semi-circular plates 6 are pivotally connected to a hinge pin 7 extending diametrally across the valve body 1 parallel to cross-member 4. In the valve closed position, the two generally semi-circular or D-shaped plates 6 are pivoted around hinge pin 7 into sealing contact with the valve seat 5. A stop pin 8 extends diametrally across the valve body 1 parallel to hinge pin 7 to limit the degree of opening of the valve plates 6. Optionally a spring or springs 9 bias the dual valve plates 6 into sealing contact with the valve seat 5.

Figure 2:
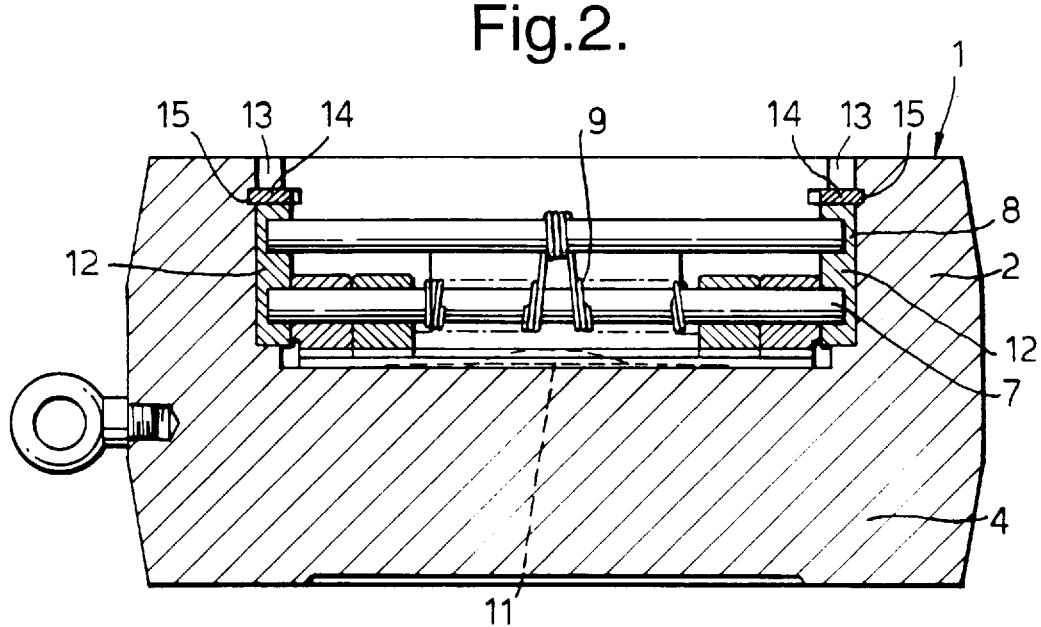
FIG. 2 is a diametral cross-sectional view along the 1—1 of FIG. 1.
Figure 3:
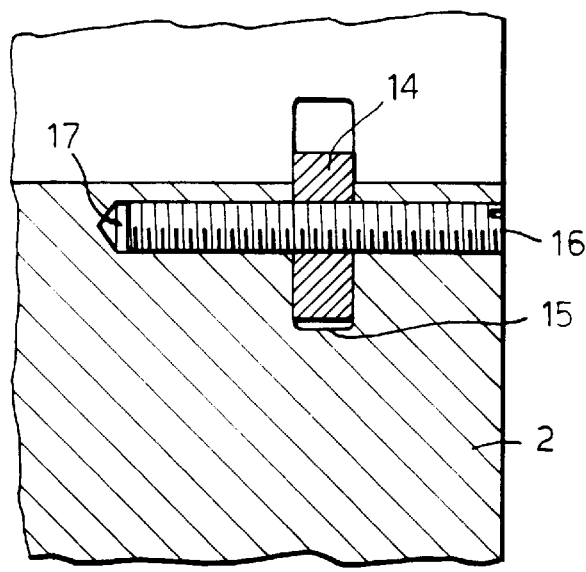
FIG. 3 is a partial sectional view showing keeper plate and retaining screw location of a retaining means according to the present invention.
Figure 4:
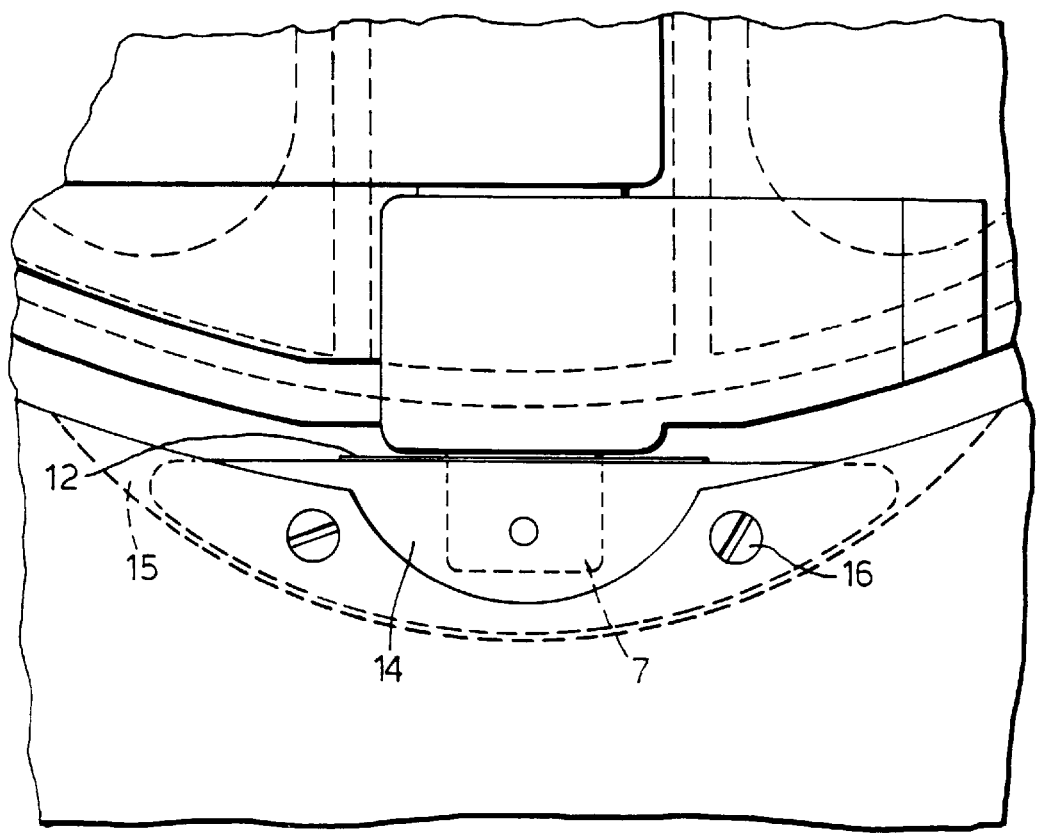
FIG. 4 is a partial valve face view showing the keeper plate and retaining screw location of a retaining system according to the present invention.

The valve plates 6 shown in FIGS. 1 and 2 each comprise a reinforced central zone portion 10 on the downstream side thereof and a corresponding relief 11 on the upstream side thereof. The flexibility of the edges of the plate 6 and rigidity of the central portion of the plate 6 enhance sealing under high pressure by permitting the profile of the sealing face of the valve plate 6 dynamically to follow any distortion in the contour of the annular seat member 3 and cross member 4 which may be caused by load when under back pressure in the valve closed position, as further described in our copending application (PCT/GB94/02627) the contents of which are hereby imported by reference.

Two inserts 12, which in cross section in this embodiment are generally semi-circular, are receivable in open sided recesses or slots 13 formed in the inner wall of the annular housing. These recesses may be of other shape. For example they may be rather more than half of a circle, providing a return to limit or prevent movement of the insert in a diametral direction. Each insert may be provided with two sockets, in the form of transverse bores or slots or depressions, the hinge pin and stop pins being respectively received in these sockets. After assembly of hinge pin, plates and stop pin, the inserts 12 are slid into the open sided recesses 13 so as accurately, simply and securely to locate the pins and the plates in position within the housing. The insert receiving open sided recesses 13 may be readily formed in the inner wall of the housing, for example by plunge drilling or milling in a simple operation. The inserts 12 may be of any suitable material, depending upon the proposed use of the valve.

The inserts 12 are held in place by means of a pair of keeper plates, 14, received in slots 15 formed in the valve body transversely to the insert receiving recess 13. The keeper plates 14 are retained in place in the slots 15 by means of retaining screws 16 located in screw hole bores 17 formed in the valve body to either side of each of the insert receiving recesses 13, each said retaining screw 16, passing through and being retained by a respective tapped hole 18 in a said keeper plate 14. The keeper plate 14 may be retained by other suitable means such as by means of a dowel, pin, peg or clip located in a bore in the annular housing and extending into or through a corresponding bore formed in the keeper plate 14.

This system for retaining the inserts 12 in place is cheap and easy to manufacture and to assemble and extremely accurate in location. Apart from the relatively small areas of the insert receiving recesses and the screw hole bores there is no disturbance of or interference with the valve face allowing good contact to be maintained between the valve face and adjacent pipe work and/or gaskets.

The system is applicable to valves having one or two hinge pins and to valves with or without stop pins, the ends of the pins in each case being received in sockets in inserts retained as described in open sided recesses 13 formed in the valve body 1.

Figure 5:
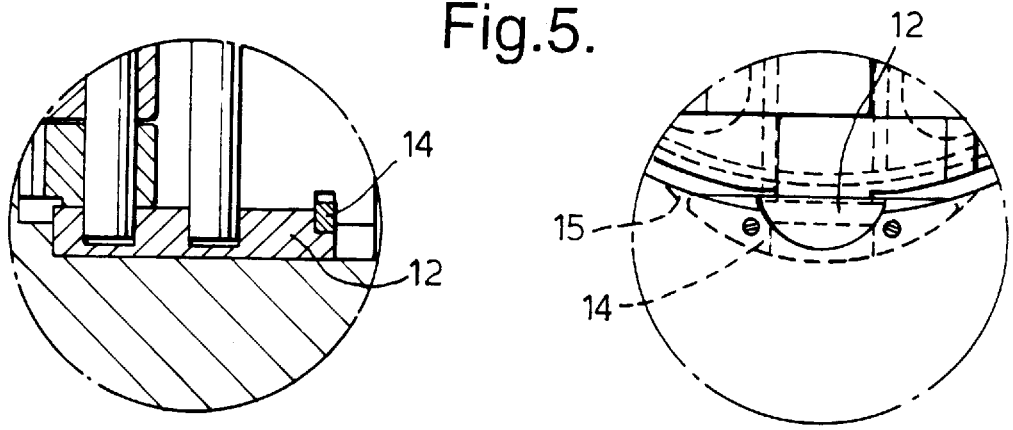
FIGS. 5 to 10 are partial views showing alternative embodiments of valves having keeper plates in accordance with the present invention.
Figure 6:
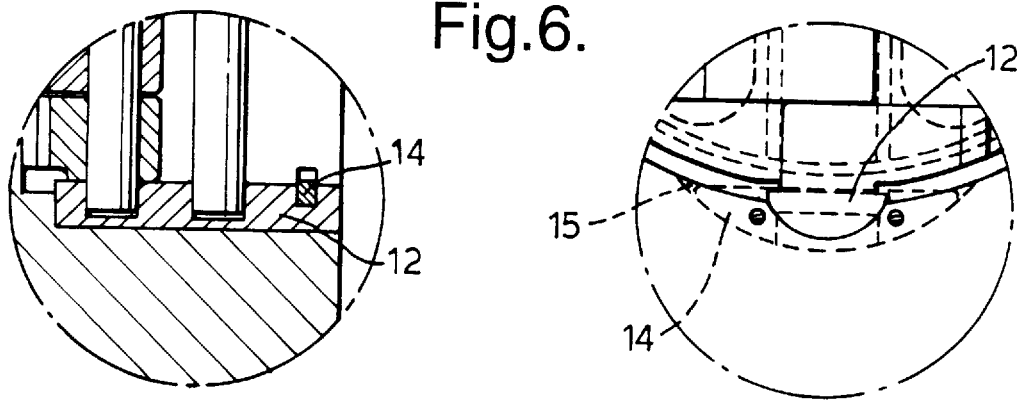
Figure 7:
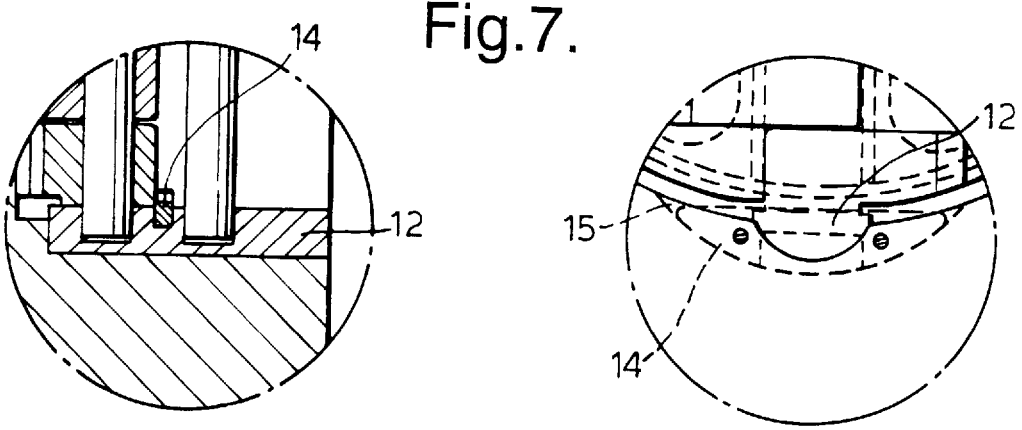

Whereas in FIGS. 1 to 4 the keeper plate 14 is shown as extending across the top of the insert 12 in a further embodiment, shown in FIGS. 5 to 7, the keeper plate 14 may be partially cut away and cooperate with a receiving slot formed in the insert 12, which provides additional location against radial movement of the insert 12.

Figure 8:
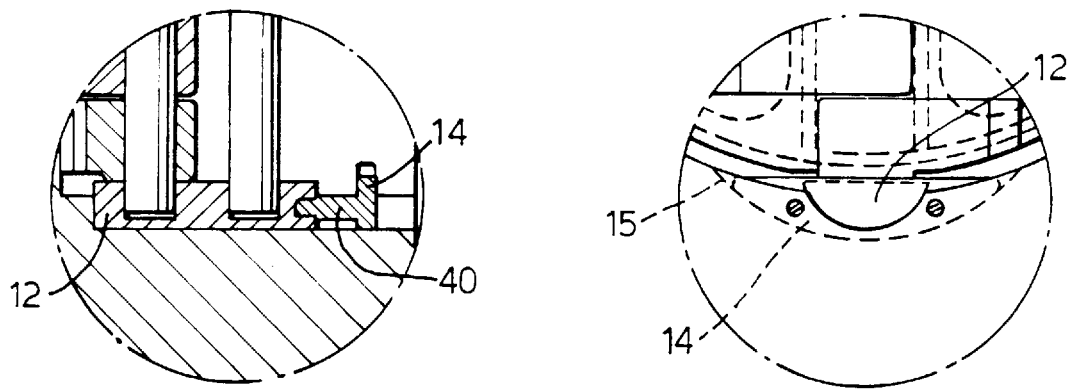
Figure 9:
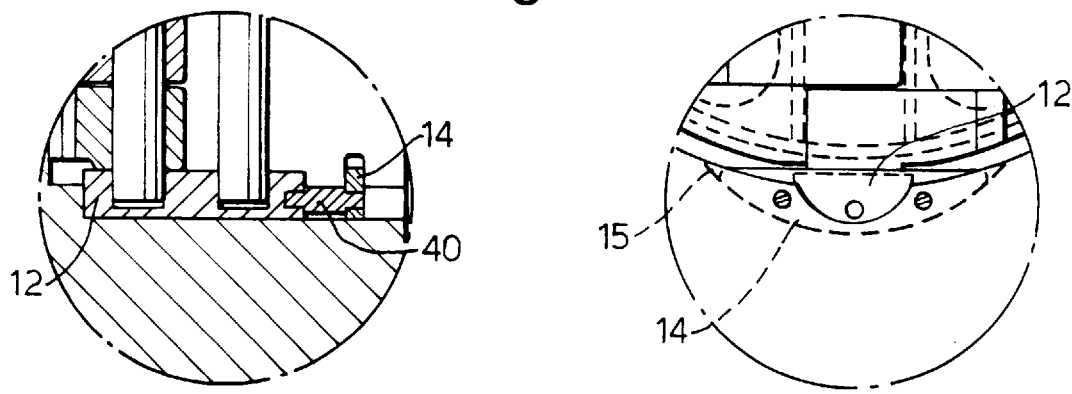

In a further embodiment illustrated in FIGS. 8 and 9, a dowel or spacer 40 may be provided between the insert 12 and the keeper plate 14 to accommodate different valve sizes with the same insert 12. The spacer 40 may be integrally formed with the keeper plate 14.

Figure 10:
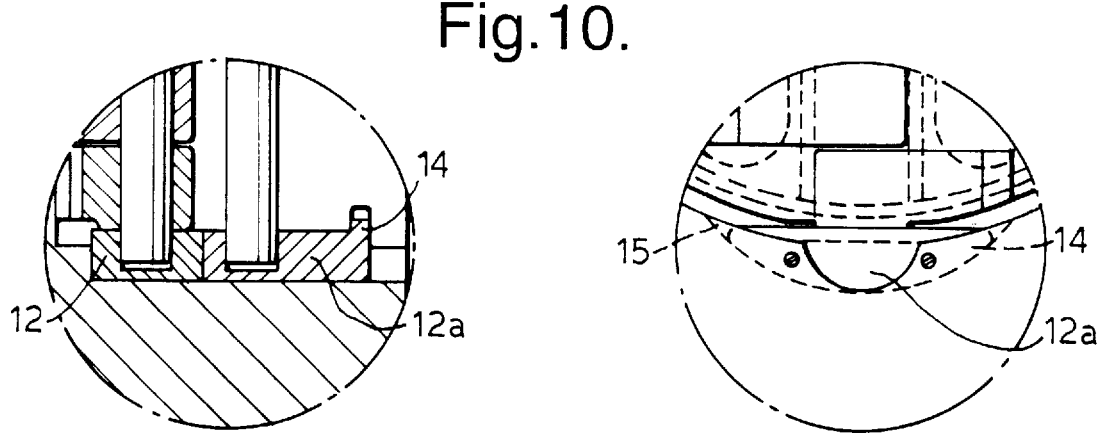

As illustrated in FIGS. 10 for a valve with a stop pin, advantageously separate inserts 12a to retain the stop pin may be provided, which inserts may incorporate a keeper plate 14, which may be in the form of wings extending from the stop pin retaining inserts. The hinge pin 7 and valve plates 6 are assembled with the hinge pin retaining inserts 12 and the assembly located in the valve in the open sided recesses 13. The stop pin 8 is located through bores formed in the stop pin retaining inserts 12a. The stop pin receiving inserts 12a are then located in the insert receiving recesses 13 by sliding the inserts 12a away from each other along the stop pin 8 so that the integrally formed keeper plates 14 are located in the receiving radial slot 15. The keeper plate 14 is retained in position by suitable means as above, thus keeping in place the stop pin receiving inserts 12a and the hinge pin receiving inserts 12.

Figure 11:
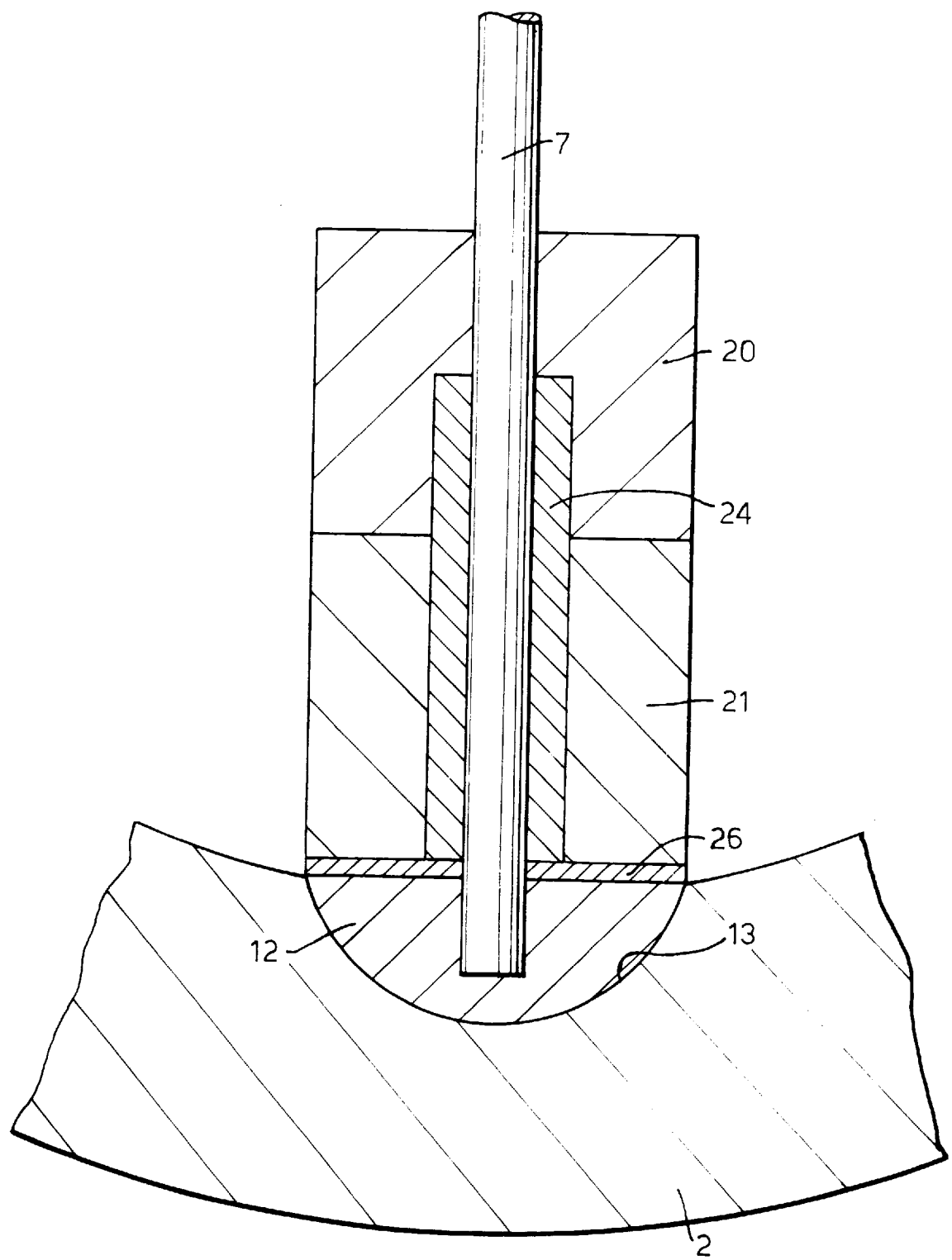
FIG. 11 is a partial cross sectional view showing a bearing system for use with the valve of the present invention.

FIG. 11 shows a modification which provides independent suspension of the valve plates 6 on a single hinge pin 7. Where a dual plate check plate with a single hinge pin 7 is mounted with the hinge pin in a vertical orientation the hinge lugs or hinge lug 20 of one plate, the upper plate, rest on the hinge lugs or hinge lug 21 of the other, lower, plate. This additional loading of the hinge of the lower plate increases the frictional force to be overcome in closing the lower plate. This results in a disparity between the forces necessary to close the upper plate and the lower plate. Particularly in larger valves, the frictional forces can become so great as to cause the lower plate to stop or hesitate before closing, thereby impairing valve response and resulting in pressure surges upon closure and increasing the likelihood of damage to the valve. UK patent 1,518,576 proposes a solution to this problem in the form of an inverted top hat shaped sleeve. This sleeve is inserted downwardly into a bore through the lower hinge lug of the lower plate, the hinge pin being inserted through this sleeve. The lower smaller annular face of the inverted top hat shaped sleeve rests, either directly or via a bearing surface, on the valve body. The upper wider annular surface of the sleeve provides a support and bearing surface for the lower hinge lug of the upper plate, such that the weight of the upper plate is supported by the sleeve and not by the lower hinge lug of the lower plate.

As illustrated in FIG. 11 a bearing sleeve comprises a cylindrical portion 24 which extends through the lower hinge lug 21 of the lower plate and partially through the lower hinge lug 20 of the upper plate, to provide a supporting bearing for the lower hinge lug 20 of the upper plate. The cylinder 24 may rest directly on the insert 12, or there may be one or more annular bearings 26 arranged between the insert 12 and the lower hinge lug 21 of the lower plate, the cylindrical bearing 24 either passing through or resting upon said annular bearing or bearings 26. Advantageously the cylindrical bearing portion 24 and the bearing washer 26 may be integrally formed, or the cylindrical bearing portion 24, bearing washer 26 and insert 12 may be integrally formed or may be separately formed but provided as an integrated pre-assembled component for ease of valve manufacture and replacement. These advantageous embodiments are not provided by the inverted top hat sleeve arrangement of UK Patent 1,518,576 which requires any bearing washer for the lower hinge lug 21 of the lower plate to be separately provided in order to allow insertion of the inverted top hat sleeve through the lower hinge lug of the lower plate.

Since the inner surface of the body 1 is cylindrical, the surface upon which the inverted top hat support sleeve of UK 1,518,576 would rest in a conventional valve, where the hinge pin is retained by external plugs, is curved. It is necessary to provide a flat surface for the support sleeve to rest upon such as by spot-surfacing and machining the body to form a recess or by providing a separate intermediate bearing with a curved or bevelled lower surface and flat upper surface. In the preferred embodiment of the present invention where the bearing 24, 26 rests upon the insert 12, a flat surface can readily be provided on the insert 12.

The bearing 24, 26 may advantageously be used in a conventional valve, where the hinge pin is retained by external plugs, for example, by suitably forming the bearing portion 26 to fit the curvature of body 1. It may also advantageously be used with inserts 12 held in place other than by keeper plates 14, such as by the retaining means described in EP-A-0,160,576.

I claim:

1. A dual plate check valve comprising an annular housing and two closing flaps effective to close a passage through the housing, the flaps being mounted on at least one hinge pin, said at least one hinge pin extending at each end into a socket in an insert, the inserts being received in respective open sided recesses in the annular housing wherein each said insert is retained in a said recess by means of a keeper plate located in a generally radially outwardly extending slot formed in said annular housing, and wherein each said keeper plate is retained in said radial slot by means of retaining screws, dowels, pins, pegs or clips located in bores in said annular housing and extending through corresponding bores formed in said keeper plate.

2. A valve according to claim 1 comprising a single hinge pin for supporting both flaps by means of hinge lugs on each flat;
a cylindrical bearing member through which said hinge pin passes, said cylindrical bearing member being arranged such that when the valve is orientated for use with the hinge pin in a vertical orientation the cylindrical bearing member is supported by a lower one of said inserts and extends through a lower hinge lug of a first flap and partially through a lower hinge lug of a second flap, thereby to support said lower hinge lug of said second flap independently of said lower hinge lug of said first flap.

3. A valve according to claims 1 or 2 further comprising:
a diametral stop pin;
a pair of stop pin receiving inserts each having a bore or slot for receiving an end of said stop pin;
said stop pin receiving inserts each being located in a said recess on a downstream side of said valve;
said keeper being integrally formed with said inserts which receive said stop pin.

4. A dual plate check valve comprising:
an annular housing and two closing flaps effective to close a passage through said housing;
a single hinge pin for supporting both flaps by means of hinge lugs on each plate;
a cylindrical bearing member through which said hinge pin passes, said cylindrical bearing member being arranged such that when the valve is orientated for use with the hinge pin in a vertical orientation the cylindrical bearing member is supported on said annular housing and extends through a lower hinge lug of a first flap and partially through a lower hinge lug of a second flap, thereby to support said lower hinge lug of said second flap independently of said lower hinge lug of said first flap.

* * * * *

UNITED STATES PATENT AND TRADEMARK OFFICE
CERTIFICATE OF CORRECTION

PATENT NO. : 5,819,790
DATED : October 13, 1998
INVENTOR(S) : James Nicholas Cooper It is certified that error appears in the above-identified patent and that said Letters Patent is hereby corrected as shown below:

Column 2, line 41, "1-1" should be --line I-I--.

Signed and Sealed this

Fifth Day of October, 1999

Attest:

Q. TODD DICKINSON

*Attesting Officer*　　　*Acting Commissioner of Patents and Trademarks*